United States Patent
von Rothkirch und Panthen et al.

(10) Patent No.: US 8,789,881 B2
(45) Date of Patent: Jul. 29, 2014

(54) SWIVELABLE ARM REST FOR USE IN A VEHICLE

(75) Inventors: Eberhard von Rothkirch und Panthen, Sommerach (DE); Thomas Hessdörfer, Karlstadt (DE); Daniel Seger, Frankenwinheim (DE); Thomas Achtelstetter, Kitzingen (DE)

(73) Assignee: F.S. Fehrer Automotive GmbH (DE)

( * ) Notice: Subject to any disclaimer, the term of this patent is extended or adjusted under 35 U.S.C. 154(b) by 549 days.

(21) Appl. No.: 12/938,697

(22) Filed: Nov. 3, 2010

(65) Prior Publication Data

US 2011/0115275 A1    May 19, 2011

(30) Foreign Application Priority Data

Nov. 18, 2009 (DE) .......................... 10 2009 053 537

(51) Int. Cl.
    *A47C 17/04* (2006.01)
(52) U.S. Cl.
    USPC .......................... 297/113; 297/411.32; 16/358
(58) Field of Classification Search
    USPC .......... 297/411.32, 112, 113, 411.33, 411.38, 297/115; 16/358, 359
    See application file for complete search history.

(56) References Cited

U.S. PATENT DOCUMENTS

| | | | | |
|---|---|---|---|---|
| 3,916,481 A | * | 11/1975 | Pittasch | 16/245 |
| 4,979,265 A | * | 12/1990 | Grass | 16/291 |
| 4,984,847 A | * | 1/1991 | Bedu et al. | 297/411.38 |
| 4,999,879 A | * | 3/1991 | Baer | 16/354 |
| 5,116,099 A | * | 5/1992 | Kwasnik et al. | 297/188.15 |
| 5,289,656 A | * | 3/1994 | Vetter | 49/250 |
| 5,352,012 A | * | 10/1994 | Chowdhury et al. | 297/113 |
| 2004/0090104 A1 | * | 5/2004 | Seibold | 297/411.35 |
| 2006/0071529 A1 | * | 4/2006 | Yetukuri et al. | 297/411.32 |
| 2007/0067958 A1 | * | 3/2007 | Salice | 16/354 |
| 2008/0301909 A1 | * | 12/2008 | Chien et al. | 16/362 |
| 2010/0148561 A1 | * | 6/2010 | Runde | 297/411.33 |
| 2011/0316310 A1 | * | 12/2011 | Runde | 297/113 |

FOREIGN PATENT DOCUMENTS

| | | | | |
|---|---|---|---|---|
| DE | 3825781 A1 | * | 2/1990 | B60N 2/46 |
| DE | 19812432 A1 | | 9/1999 | |
| DE | 20 2007 016 332 U1 | | 3/2008 | |
| EP | 0346251 | * | 12/1989 | A47C 1/03 |

* cited by examiner

Primary Examiner — David E Allred
(74) Attorney, Agent, or Firm — Quarles & Brady LLP

(57) ABSTRACT

An arm rest for arrangement at a seat or a seat bench in a vehicle, includes at least one bracket fastenable to the seat or the seat bench. A bearing shaft is swivelably mounted to the bracket in at least one swivel bearing. The bearing shaft is supported at the bracket so as to be displaceable along a trajectory between an upper functional position and a lower functional position. A support element is connected to the bearing shaft at least at one fastening point in a rotationally fixed manner. The support element can be swiveled between a swiveled-up rest position and a swiveled-down support position. A transmission mechanism is arranged between the support element and the bracket, wherein a swiveling movement of the support element is transmitted via the transmission mechanism to a displacing movement of the bearing shaft along the trajectory. Hereby, modularity of the arm rest is obtained, wherein the variation of the transmission mechanism permits the utilization of an identical support element for different support heights.

13 Claims, 8 Drawing Sheets

SWIVELABLE ARM REST FOR USE IN A VEHICLE

CROSS REFERENCE TO RELATED APPLICATION

This application claims priority to German Patent Application No. 10 2009 053 537.3, filed on Nov. 18, 2009, which is fully incorporated herein by reference.

STATEMENT REGARDING FEDERALLY SPONSORED RESEARCH OR DEVELOPMENT

Not applicable.

FIELD OF THE INVENTION

The present invention relates to an arm rest for arrangement at a seat or a seat bench.

BACKGROUND OF THE INVENTION

From automotive technology vehicles are known, which are equipped with arm rests at the seat or at the seat bench, i.e. at the front seats and/or at the back seats. As a general rule, arm rests arranged in the center between seats are swivelably mounted in a swivel bearing with the aid of a bearing shaft and can be swiveled between a swiveled-up rest position and a swiveled-down support position. The swiveled-down support position makes it possible for the user to prop his/her arms upon the arm rest. When utilized as a center arm rest for front seats of a vehicle, the swiveled-up rest position serves for providing the driver with access to the center brackets disposed underneath the arm rest. When utilized as a center arm rest at a back seat bench, the swiveled-up rest position at the same time serves as the utilization position for a back rest and thus forms a part of the back rest.

Generic arm rests include definite arm rest positions both in the swiveled-up rest position and in the swiveled-down support position. This is simply realized by arranging at an arm rest body, respectively a support element, a fixedly arranged rotational axis, respectively a bearing shaft, which in turn is fastened to a bracket in a specific position, wherein the bracket is firmly connected to the seat. In this way, swiveling of the support element about the rotational axis is easily possible. In this context, from the state of the art specific embodiments for connecting the bearing shaft and the equally necessary stop are known. As a general rule, the bearing shaft is formed from a cylindrical body that correspondingly penetrates the bracket. Due to the confined space available, the stop required for limiting the movement in the support position as a general rule is attached to a lateral side of the arm rest and is arranged in parallel to the rotational axis. The stop, which for this purpose is guided in a guiding groove, correspondingly limits the movement between the rest position and the support position.

It is apparent that the known state-of-the-art arm rests are required to feature a special structure for each type of cushioning in terms of the support element, the mounting and the bracket. In this regard, it is necessary to design the state-of-the-art arm rests specific to each vehicle type in the embodiment which matches the type of cushioning assigned to the vehicle seat position. Similarly, it may occur that identical seat cushions and back rests are utilized for different vehicle types, however, due to the position of the seat in the vehicle, the arm rests disposed in the side coverings are required to be designed differently. In this regard, however, it is desirable that the center arm rest in the support position is also situated at the same height as the side arm rest.

The generally required common part strategy pursues the aim of achieving a cost reduction by means of utilizing common parts, i.e. higher piece numbers. In the light of the aspect that in particular the support element makes up a significant share of expenses and thus gives rise to increased costs owing to the production which is adapted to each individual type of seat, it is envisaged to configure in particular the support element as a common part.

SUMMARY OF THE INVENTION

Thus, it is an object of the present invention to create an arm rest for use in vehicle seats, which can be employed for various seat designs, respectively cushion heights, subject to slight modifications when an identical arm rest body is utilized.

This object is achieved by an arm rest for arrangement at a seat or a seat bench in a vehicle. The arm rest includes at least one bracket, which can be fastened to the seat or the seat bench, and a support element. The support element is connected to a bearing shaft at least at one fastening point in a rotationally fixed manner, and wherein the bearing shaft is swivelably mounted at the bracket in at least one swivel bearing, and wherein the support element can be swiveled between a swiveled-up rest position and a swiveled-down support position. The bearing shaft is supported at the bracket so as to be displaceable along a trajectory between an upper functional position and a lower functional position, wherein between the support element and the bracket a transmission mechanism is arranged. Wherein a swiveling movement of the support element is transmitted via the transmission mechanism to a displacing movement of the bearing shaft along the trajectory.

In one embodiment, when utilized as a back seat bench, the bracket is firmly connected to the back rest of the back seat. When utilized as a center arm rest for the front seats, the bracket is hence rigidly fastened to the vehicle between the two seats. Likewise, the arm rest may be firmly connected to one individual seat. Moreover, the arm rest comprises the support element, wherein the support element is correspondingly provided for the purpose of supporting the arm thereon. For connecting the support element with the bracket, provision is made for a bearing shaft, wherein for this purpose, the bearing shaft is connected to the support element in a rotationally fixed manner. In a simple case, the bearing shaft may be a cylindrical body, the design thereof, however, being basically arbitrary. The bearing shaft in turn is swivelably mounted at the bracket in at least one swivel bearing, which allows the support element to be swiveled between a swiveled-up rest position and a swiveled-down support position. The swivelable mounting makes it possible to ensure that the support element remains positioned at the bracket. During assembly of the arm rest, a displacement of the support element beyond the functional play in the direction of the rotational axis of the bearing shaft is precluded as a result of the arrangement of the support element between surrounding regions of the bracket. In a plane vertically disposed with respect to the rotational axis,
the movement of the arm rest relative to the bracket is limited by the connection of the bearing shaft to the bracket. However, it should be considered that, according to the inventive solution, the connection of the bearing shaft to the bracket does not refer to a type of mounting which is limited to a rotational movement, but rather allows a relative positional change between the support element and the bracket.

The object that the arm rest shall be employable in seats of different seat heights is attained by the inventive embodiment. For this purpose, the bearing shaft is supported at the bracket so as to be displaceable along a trajectory between an upper functional position and a lower functional position. To enable the implementation, a transmission mechanism is thus required between the support element and the bracket, wherein a swiveling movement of the support element is transmitted via the transmission mechanism to a displacing movement of the bearing shaft along the trajectory.

By means of the displacing movement coinciding with the swivel movement, an individual height adjustment to various seat types can be attained in a simple manner. For this purpose, it is only necessary to select the transmission mechanism in such a manner that the displacing movement can be adapted corresponding to the requirements in terms of the seat height. Hence, it is possible to utilize an identical support element for different seat types, respectively different seat heights, wherein in particular in case of smaller piece numbers of a vehicle model, economies of scale in terms of piece numbers can be realized for the support element. Henceforth, the arm rests can be produced together for different seats on the basis of identical support elements. This has hitherto not been possible in the state of the art, but in each case has required a support element specifically adapted to the respective seat height.

The inventive arm rest can be particularly advantageously employed if it forms a part of a back rest. Thus, it is frequently possible to utilize a basically identical back rest for different seat arrangements. Due to slightly varying seat heights, respectively different arm rests in the side coverings of the vehicle, it is necessary to adapt the arm rest in the support position corresponding to the requirements in terms of height. This can be realized in a correspondingly advantageous manner by the inventive solution. In this regard, utilization in particular in the back rest is suitable.

For adapting the height in the swiveled-down position on the one hand, the option is available to move the bearing shaft and thus the support element downwardly along the trajectory when the support element is swiveled from the rest position into the support position with the aid of the transmission mechanism. However, the arrangement in which the bearing shaft occupies the upper functional position in the support position of the support element and the lower functional position in the rest position of the support element is particularly advantageous. This means that with the aid of the transmission mechanism, due to the swiveling movement, a displacement of the bearing shaft from the lower position into the upper position is performed at the same time. Forming a part of a back rest, the lower functional position in the rest position of the support element is always identical regardless of the seat arrangement. The variability for utilization in a large variety of different seat arrangements can be realized if the upper functional position is selected so as to match the respective seat arrangement. To this end, the correspondingly matching transmission mechanism, respectively the correspondingly necessary transmission from the rotational movement to the displacing movement along the trajectory needs to be selected.

For realizing a transmission mechanism, corresponding elements are necessary. According to a preferred embodiment, the transmission mechanism is formed by a first and a second transmission element. A transmission by means of an intermediate gear, a belt drive or other gear wheel is not necessary.

According to a preferred embodiment, the first transmission element is firmly connected to the bearing shaft and forms a part of the bearing shaft. Depending on the design of the bearing shaft, which in principle may be arbitrary, the end of the bearing shaft may at the same time also form the transmission element. It is equally possible to firmly mount the transmission element on the bearing shaft. According to another embodiment, it is possible that the first transmission element at the same time forms the mounting position in the swivel bearing at the bracket, wherein the transmission element which fulfils a bearing function in turn is fastened to a shaft component which is mounted at a support element. According to a preferred embodiment, the first transmission element is formed as a gear wheel segment or friction wheel segment. As a matter of course it is also possible to utilize a complete gear wheel, respectively a friction wheel, even though as a general rule, only a swiveling movement by approx. 120° is possible, respectively necessary. Depending on the type of the force transmission, here the utilization of a gear wheel segment is advantageous.

For realizing the transmission mechanism, the second transmission element is correspondingly necessary complementary to the first transmission element. For this purpose, the second transmission element is fixedly connected to the bracket or is formed as a part of the bracket. According to the design of the first transmission element as a gear wheel segment, the second transmission element is advantageously formed as a gear rod. As a general rule, a straight gear rod will be implemented, but it may equally be arc-shaped if it fulfils the same function.

In all embodiments of swivelable arm rests known from the state of the art, the supporting forces acting from the arm of the user in general vertically onto the support element are transmitted through the bearing shaft to the corresponding bracket while vertically passing through the rotational axis. The limitation of the swiveling movement conventionally is performed via a stop. In contrast hereto, according to preferred embodiments, the vertically acting forces are transmitted from the support element via the transmission element, respectively a carrier element firmly connected thereto, to the second transmission element, respectively a second carrier element firmly connected thereto. This applies in particular to the embodiment in which the bearing shaft in the rest position is situated in the lower functional position and in the support position is situated in the upper functional position. This means that the forces to be transmitted do not pass through the rotational axis of the bearing shaft but rather are shifted laterally with respect to the rotational axis. According to the embodiment utilizing a gear wheel segment without an additional carrier element, the corresponding forces are transmitted via the gearing of the first transmission element to the gearing of the gear rod of the second transmission element. Due to the limited swiveling movement it is furthermore possible to additionally provide the transmission element with a first carrier element which gets into contact with a second carrier element only upon completion of the swiveling movement in the support position. The second carrier element is correspondingly fastened at the bracket and is formed as a part of the bracket. In this case, primarily the forces to be transmitted are transmitted from the first carrier element to the second carrier element. The position of the first carrier element, in this case, is located radially on the outside of the first transmission element.

The formation of the transmission element from a first transmission element acting circularly and a second transmission element acting primarily linearly necessitates a corresponding support of the bearing shaft so as to enable a defined mounting of the bearing shaft at the bracket. For this purpose, the bracket has a first and/or a second guiding groove which comprises a first and/or a second guiding surface. In compliance with the necessity to guide the bearing shaft, respectively the transmission element, the first, respectively the second guiding surface, is situated on the side of the respective groove which faces the second transmission element. Being situated on the opposite side, when viewed in the installed position when the engagement between the first and the second transmission element is performed on the left-hand side of the rotational axis of the bearing shaft, means that the first and/or the second guiding surface is consequently located on the right hand side of the relevant guiding groove and vice versa. This means that the guiding surface and the transmission mechanism limit the range of movement of the bearing shaft, respectively the first transmission element, transversal to the trajectory. Hence, a movement of the bearing shaft, respectively of the first transmission element, transversal to the trajectory beyond a necessary range of play is precluded. In this regard, the groove is by no means required to have a constant width, since substantially only the position of the guiding surface is of relevance rather than the width of the guiding groove. As regards functionality, one guiding surface is sufficient here.

Since a stop is additionally required for supporting the acting forces, a bolt is advantageously arranged at the support element at a distance from the bearing shaft. For this purpose, the bolt is guided along the second guiding surface, wherein the guiding groove correspondingly limits the path of the bolt and hence forms a stop in the support position.

Various options are available for designing the guide for the bearing shaft and the guide for the bolt. On the one hand, it is possible to form a large recess, wherein the surface of the recess which faces the second transmission element forms the second guiding surface, along which the bolt in turn is guided, which at the same time limits the path of the bearing shaft transversal to the trajectory.

Alternatively, it is possible to make provision for a groove for the bearing shaft, which for this purpose has a first guiding surface which in turn is situated so as to face the second transmission element and thus extends in parallel to the trajectory and correspondingly limits the range of play of the bearing shaft transversal to the trajectory. In this instance, provision needs to be made for only one stop which may be formed in any arbitrary design and which for this purpose needs to be firmly connected to the bracket or may form a part of the bracket.

According to a preferred embodiment, however, provision is made for two guiding grooves, wherein on the one hand, one guiding groove guides the bearing shaft and a second guiding groove guides the bolt. When the support element is swiveled into the final position in the rest position, a guiding action performed by the bolt realizes only insufficient securing of the movement transversal to the bearing shaft. In this instance, it is advantageous if the bearing shaft is guided along a first guiding surface in a first guiding groove.

According to the object of realizing a modular design for the arm rest, wherein the transmission mechanism needs to be adapted corresponding to the selected seat arrangement, it is advantageous if the first transmission element is mounted at the bearing shaft. By the selection of the diameter of the transmission element, it is possible to realize the range of travel between the upper and the lower functional position while correspondingly adapting the second transmission element. Hence, in the support element, it is sufficient if only the first transmission element, respectively the gear wheel segment, is exchanged. In this regard, using the preferred embodiment, in particular the modular design may be realized, since here, the entire support element, apart from the gear wheel segment, may be configured identically. Matching the selected first transmission element, a corresponding configuration of the bracket with respect to the second transmission element as well as the guiding surfaces is necessary. In particular when employing a bolt in a second guiding groove, which for this purpose is guided along the second guiding surface, it is necessary to correspondingly adapt the guiding groove to different ranges of travel. The first guiding groove, respectively the first guiding surface, here may remain unchanged.

Depending on the requirements in terms of handling convenience, respectively the necessary expenditure of forces when swiveling the support element, it may be advantageous if a damping element and a catch element are provided. By means of this measure, it is ensured that on the one hand, the support element does not unintentionally depart from its final position in the support position or else in the rest position, and on the other hand, the support element can be swiveled by hand while experiencing a uniform movement without the risk that the support element may come off. To this end, the option is available to attach to the bracket an additional clamping element, for instance made of a POM plastic material. Advantageously, in this instance, the edge region of a guiding groove, in particular of the second guiding groove, is formed with a clamping element which is integrated in the bracket. To this end, a thin web may be formed on one side of the guiding surface and may be formed so as to slightly overlap with the bolt to be moved past. The elastic deformation of the web leads to a small clamping force in the swiveling movement and secures the position of the bolt in the final positions in the guiding groove.

According to the arrangement of the arm rest in the center of a back rest, in the case of forces equally acting on both sides, it is advantageous if corresponding transmission mechanisms which are symmetrical with respect to the center are provided on both sides, and thus force-transmission points are provided.

BRIEF DESCRIPTION OF THE DRAWINGS

In the following figures, examples of preferred embodiments and basic solution options are illustrated. In the drawings.

DETAILED DESCRIPTION OF THE EXAMPLE EMBODIMENTS

Figure 1:
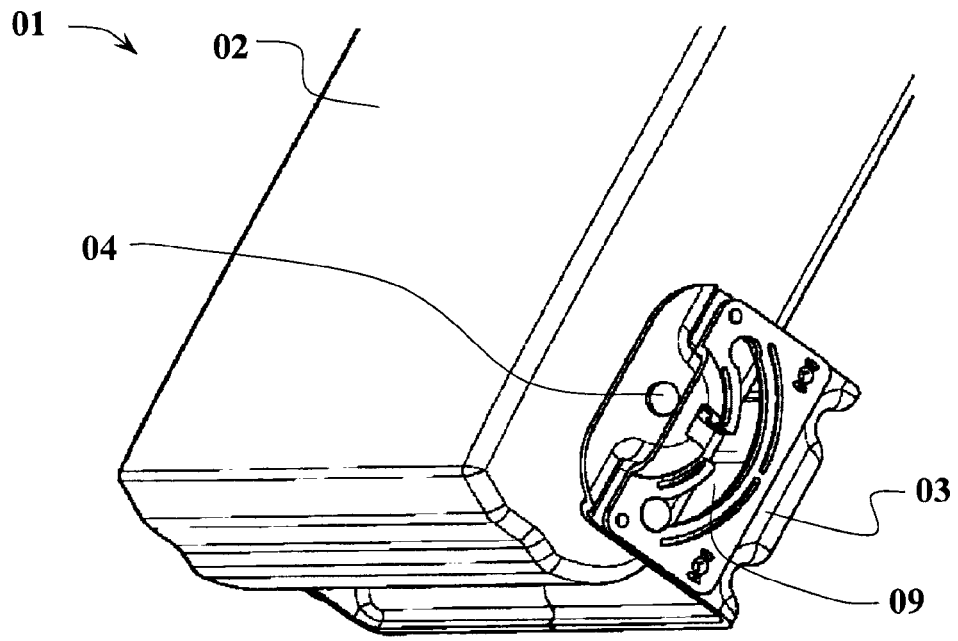
FIG. 1 shows an arm rest in the rest position comparable to the state of the art without a transmission mechanism as a basis of the modular solution.

It is an object of the present invention to provide a modular system in which essentially identical arm supports 02 can be utilized for different arm support heights in the support position. FIG. 1 accordingly shows a first embodiment of the modular system of different arm rests 01. The arm rest 01 is substantially composed of the support element 02 and the supporting bracket 03. The connection between both components is created by the bearing shaft 04. The arm support can be swiveled from the rest position into the support position about the rotational axis of the bearing shaft. For this purpose, the bracket has a guiding groove 09 arranged therein, in which a bolt 12 is guided. The ends of the guiding groove 09 thus form the end of the range of movement for the support element 02.

Figure 2:
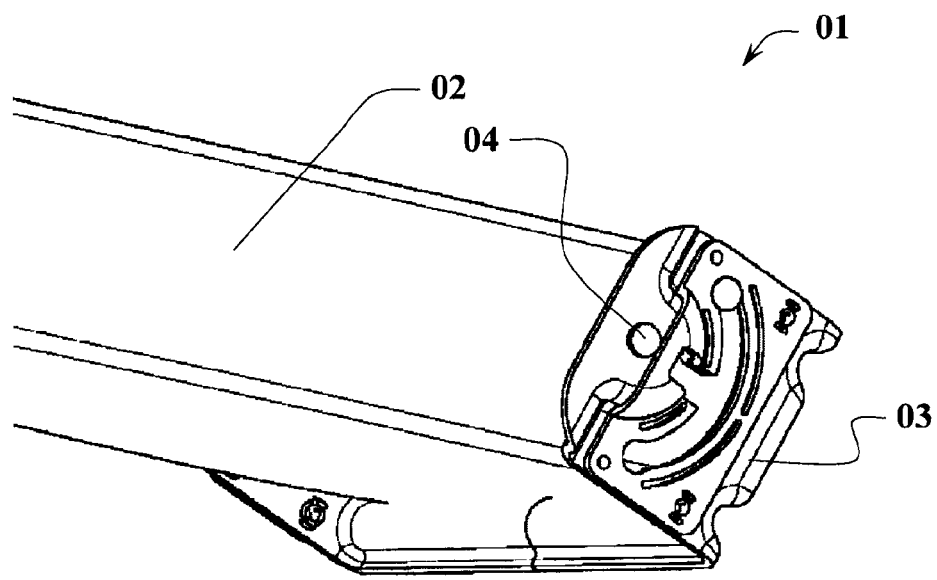
FIG. 2 shows the arm rest of FIG. 1 in the support position.

FIG. 2 shows the arm rest 01 according to FIG. 1 in the support position. The support element 02 is correspondingly situated in the swiveled-down support position. If the inventive modularity is disregarded, this solution, which is shown in FIGS. 1 and 2, corresponds to the state of the art.

Figure 3:
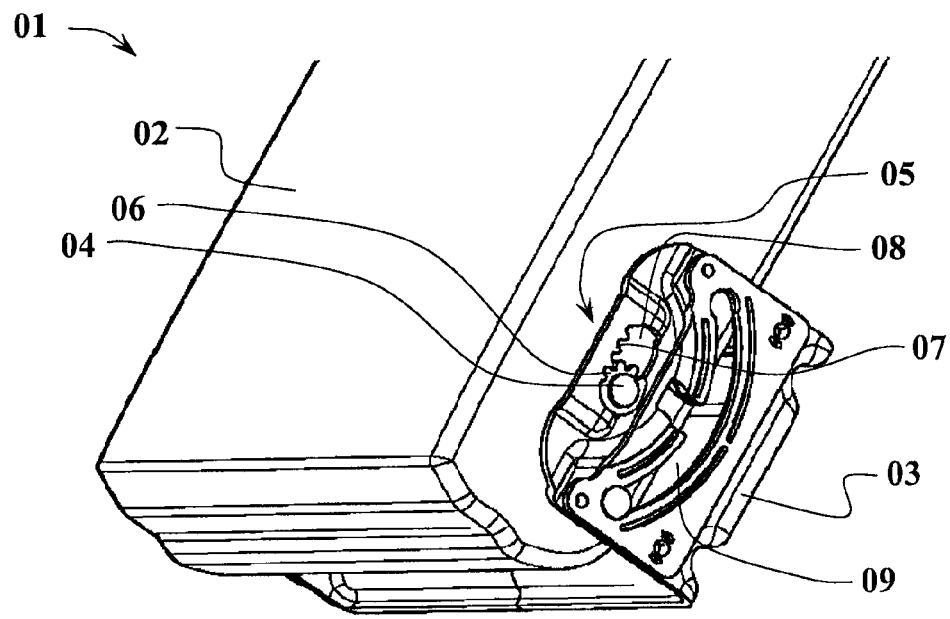
FIG. 3 shows an arm rest in the rest position with a transmission mechanism with the bearing shaft in the lower functional position.

FIG. 3 shows an arm rest 01 in an exemplary embodiment according to the inventive solution. Here, the arm rest 01 largely corresponds to the arm rest 01 of FIG. 1 in terms of modularity, wherein the inventive variations have been implemented. The connection between the support element 02 and the bracket 03 in turn is created by the bearing shaft 04. The bearing shaft, however, as known from the state of the art shown in FIG. 1, is not mounted in a bore, but rather is mounted in a first guiding groove 08. The transmission mechanism 05 which is composed of a first transmission element 06 formed as a gear wheel segment and a second transmission element 07 formed as a gear rod is essential for the inventive solution. For implementing the functionality, it is necessary that the first transmission element 06 is firmly connected to the bearing shaft 04, respectively the support element. By the same token, the second transmission element 07 necessarily is firmly connected to the bracket 03 and in this embodiment forms a part of the bracket.

Figure 4:
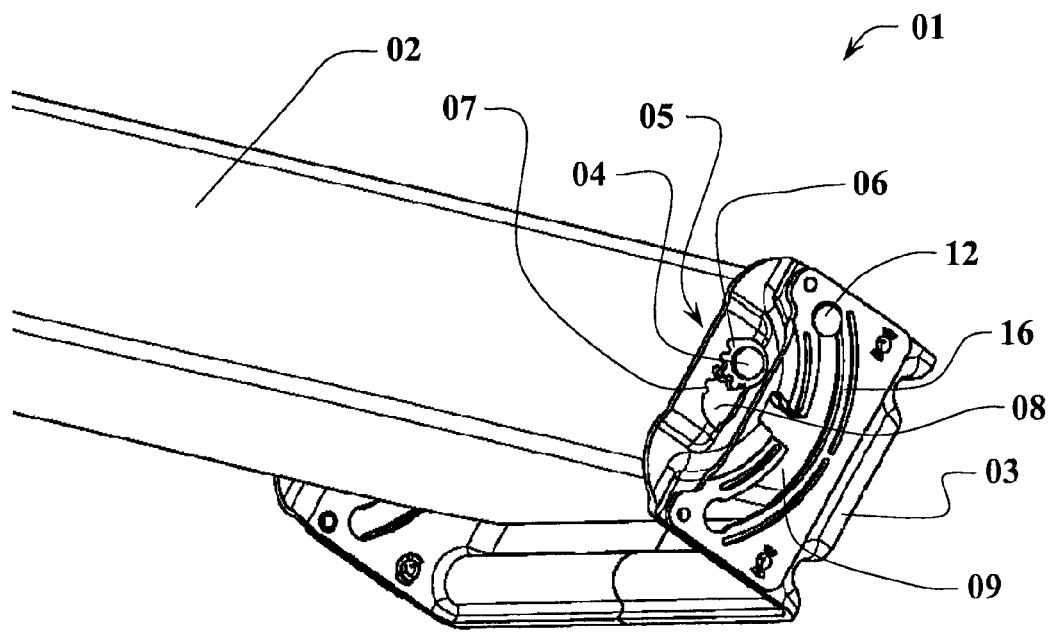
FIG. 4 shows an arm rest of FIG. 3 in the support position with the bearing shaft in the upper functional position.

FIG. 4 shows the arm rest of FIG. 3 in the support position. In a comparison between FIG. 3 with the support element in the rest position and FIG. 4 with the support element in the support position, the inventive functionality is rendered apparent. While in FIG. 3, the bearing shaft in the rest position is situated in the lower functional position, in contrast thereto in FIG. 4 showing the support element in the support position, the bearing shaft is situated in the upper functional position.

The rotation of the gear wheel segment 06 along the gear rod 07 is also apparent. The bearing shaft, respectively likewise the gear wheel segment, hereby moves along the first guiding groove 08. Damping of the sequence of movements between upper and lower functional position as well as limiting of the path of the support element is realized by the guiding of the bolt 12 in the second guiding groove 09. The two ends of the guiding groove 09 thus limit the position of the support element in the rest position according to FIG. 3, respectively the support position according to FIG. 4 via the abutment of the bolt. It should be noted that in utilization as a part of a back rest the limitation is only mandatory in the support position, since in the rest position, the support element may be brought into abutment in the recess for the arm rests and thus may be directly supported thereon.

Figure 5:
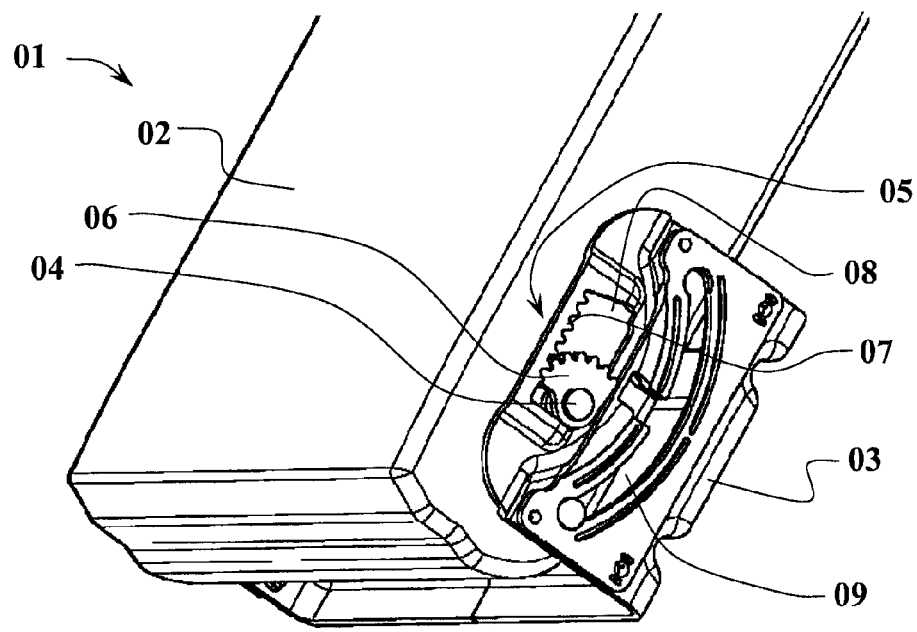
FIG. 5 shows another embodiment of an arm rest in the rest position with the bearing shaft in the lower functional position.
Figure 6:
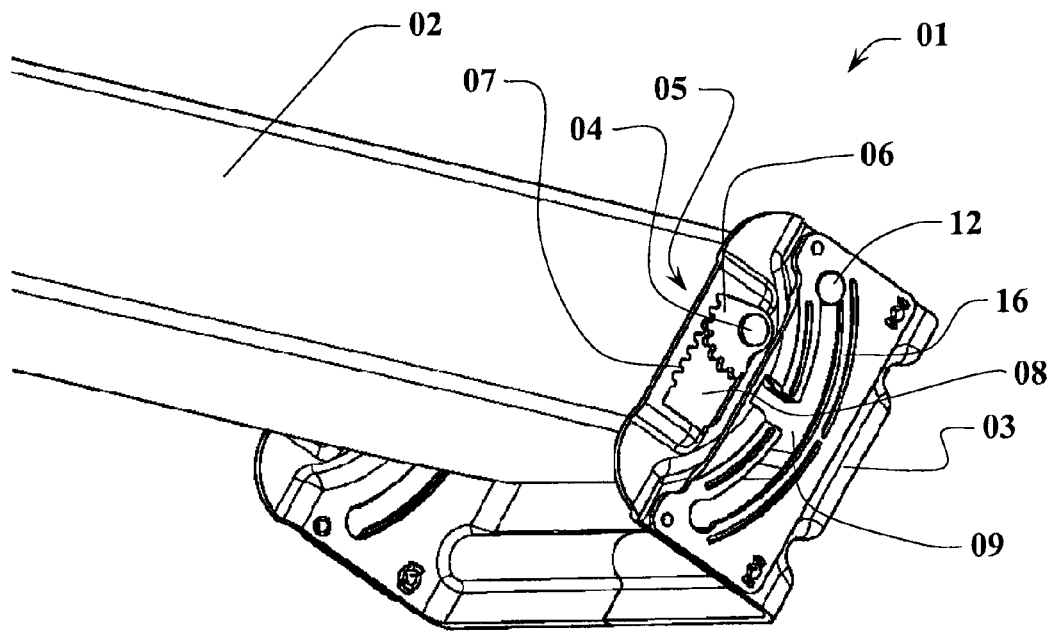
FIG. 6 shows the arm rest according to FIG. 5 in the support position with the bearing shaft in the upper functional position.

FIG. 5 and FIG. 6 show a solution for the arm rest 01 similar to FIG. 3 and FIG. 4. The mode of action and the structure correspond to the solution of FIGS. 3 and 4. The inventive modular concept is evident, since in the comparison between the solution of FIGS. 3, 4 and the solution of FIGS. 5, 6, only one variation of the first transmission element 06, respectively the gear wheel segment, has been realized and the bracket 03 has been modified so as to match this variation. The changes made to the bracket 03 include a correction of the guiding grooves 08 and 09 as well as adapting the position of the gear rod 07 as a second transmission element to the diameter of the gear wheel segment 06. It is apparent that the support element 02 can be identically selected in all embodiments according to FIGS. 1, 2 and FIGS. 3, 4 as well as according to FIGS. 5, 6. In this regard, the most cost-intensive component of the arm rest 01 has been designed as an identical common part and thus a significant reduction of costs in case of different support heights has been realized.

In the following figures, various inventive solution options are schematically illustrated.

Figure 7:
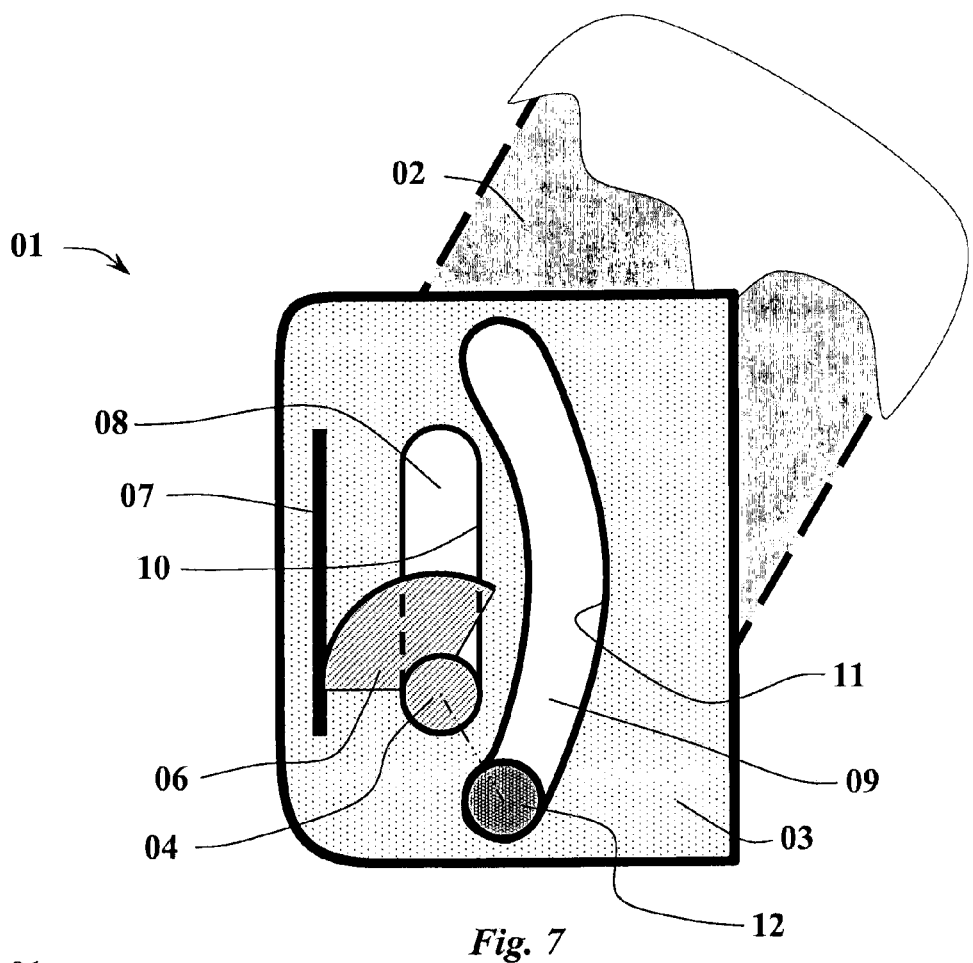
FIG. 7 shows a schematic diagram of an inventive arrangement in the rest position, wherein the transmission mechanism is drawn on the left-hand side of the guiding grooves.
Figure 8:
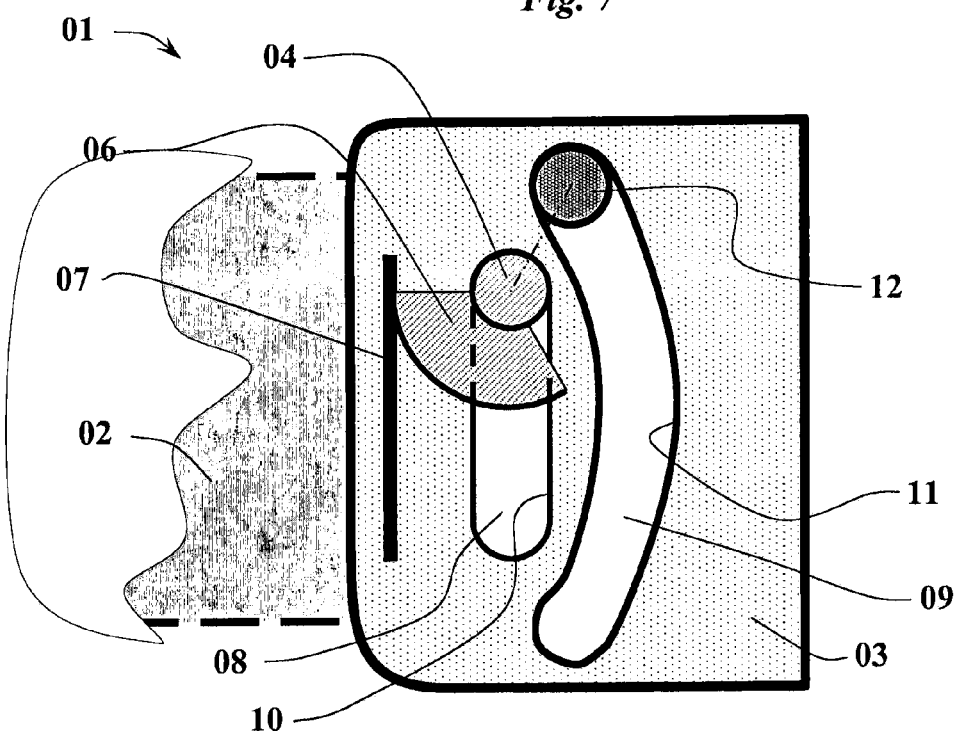
FIG. 8 shows a schematic diagram corresponding to FIG. 7 in the support position.

The embodiment of FIG. 7 and FIG. 8 largely corresponds to the principle of the solution according to FIG. 3 and FIG. 4 as well as according to FIG. 5 and FIG. 6. FIG. 7 shows an arm rest 01 in the rest position. According to this embodiment, the bearing shaft 04 is situated in the lower functional position. The bearing shaft is mounted at the bracket 03 in the first guiding groove 08. The first transmission element 06 is firmly connected to the bearing shaft 04. The first transmission element is in engagement with the second transmission element 07, which in turn is firmly connected to the bracket 03. The swivel range for the support element 02 in turn is defined by a bolt 12 in conjunction with the second guiding groove 09. It is clearly evident that a displacement of the bearing shaft 04 in the direction of the second transmission element 07 is precluded due to the engagement between the transmission elements. As a consequence, only a limitation on the side which faces the second transmission element is necessary. This can be realized by two options, wherein firstly the bearing shaft 04 is guided along a first guiding surface 10 in the first guiding groove 08. This already results in a defined position of the arrangement, since in this regard a displacement in the direction of the second transmission element is precluded due to the engagement, and conversely, is precluded due to the abutment of the bearing shaft 04 against the first guiding surface 10. The free displacement along the alignment of the second transmission element is generally precluded due the engagement between the transmission elements. In this regard, the bolt 12 is only necessary for the upward and downward limitation of the path.

FIG. 8 shows the arm rest 01 with the support element 02 in the support position. As is apparent, the bearing shaft 04 is situated in the upper functional position and the bolt 12 equally abuts against the upper end of the second guiding groove 09. From a combined view of FIG. 7 and FIG. 8, the inventive effect produced by the transmission mechanism is apparent.

Not shown here is a solution which can be slightly modified compared to the above, consisting in that the second guiding groove 09 is not situated on the right hand side of the first guiding groove, as shown in FIGS. 7, 8, but rather is situated on the left-hand side of the transmission mechanism 05 on the side of the support element 02 in the support position thereof. If the available space allows for this solution, by means of this measure the flow of forces is enhanced, since the supporting forces are transmitted through the bearing shaft 04 to the upper end of the first guiding groove 08 and do not pass through the transmission mechanism 05. The same variation applies to the following solutions as well.

Figure 9:
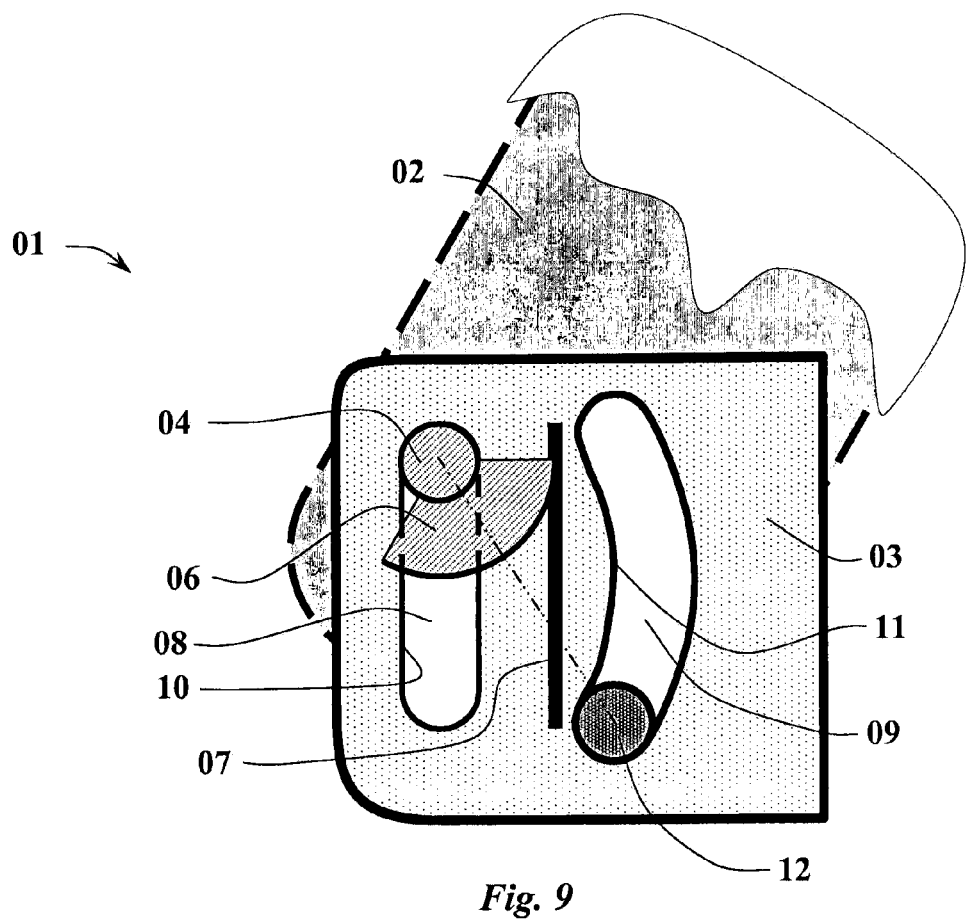
FIG. 9 shows a schematic diagram of another inventive arrangement in the rest position with the transmission mechanism arranged between the guiding grooves.

The inventive solution is by no means confined to the arrangement of the transmission mechanism on the left-hand side of the guiding grooves. FIG. 9 shows an alternative embodiment with a transmission mechanism disposed on the other side. Here, the support element 02 of the arm rest 01 is again situated in the rest position. In contrast to the previous solution, the bearing shaft here is situated in the rest position in the upper functional position. The second transmission element 07 is located on the right hand side of the bearing shaft 04. Facing the engagement location, the first guiding surface 10 is correspondingly situated on the left-hand side of the first guiding groove 08, in which in turn the bearing shaft 04 is guided. The same applies to the mounting of the bolt 12 in the second guiding groove 09, wherein the second guiding surface 11, along which the bolt 12 is allowed to slide, in turn is located on the left-hand side of the guiding groove 09.

Figure 10:
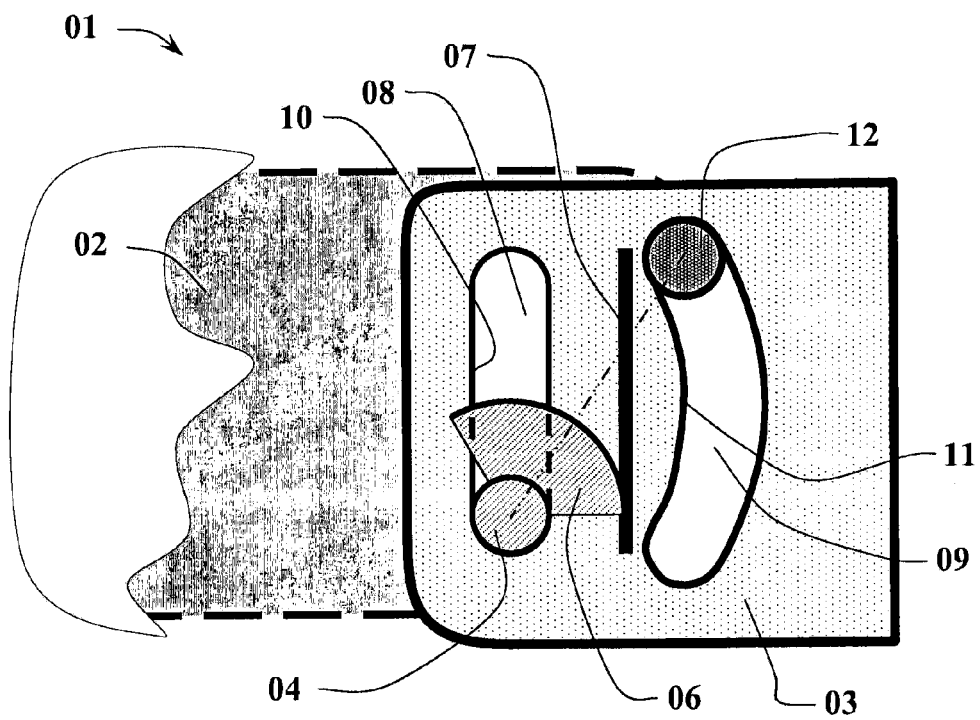
FIG. 10 shows the schematic diagram corresponding to FIG. 9 in the support position.

FIG. 10 shows the arm rest 01 with the support element 02 in the support position. The illustrated solution corresponds to the concept according to FIG. 9. In this instance, the bearing shaft 04 is situated in the support position of the support element 02 in the lower functional position. Again, from a combined view of FIG. 9 and FIG. 10, both the effect of the transmission mechanism 05 and of the guiding action of the bearing shaft 04 and the bolt 12 in the bracket 03 is rendered apparent.

Figure 11:
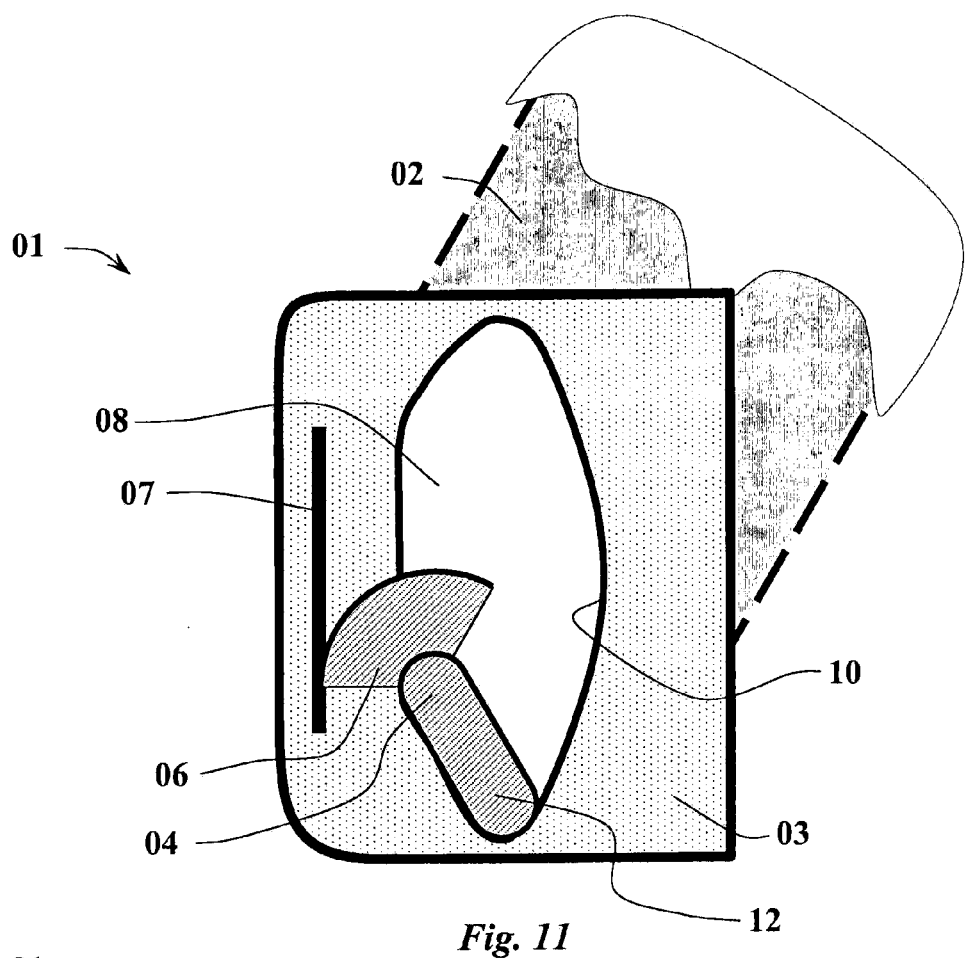
FIG. 11 shows a schematic diagram of another inventive arrangement with a large guiding groove.

As already mentioned above, it is sufficient to make provision for one guiding surface 10, 11 on the side which faces the transmission mechanism 05. A corresponding solution is schematically illustrated in FIG. 11. Here, only one large guiding groove 08 having a first guiding surface 10 is provided. In this embodiment, the bearing shaft 04 exemplarily at the same time is formed integrally with the bolt 12 rather than of two separate cylindrical bodies. In consideration of the illustrated FIGS. 7, 8 and 9, 10, the resultant swiveling movement of the support element 02 as well as of the integrally formed body made of the bearing shaft 04 and the bolt 12 is easily comprehensible.

Figure 12:
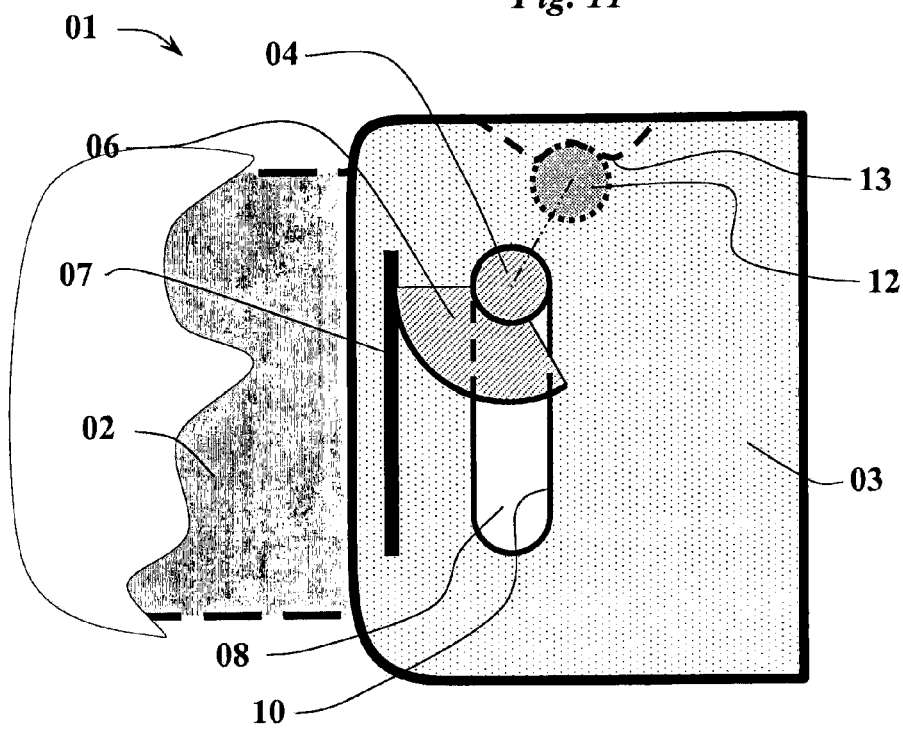
FIG. 12 shows a schematic diagram of another inventive arrangement with a first guiding groove without a second guiding groove, wherein the bolt is arrested by a stop.

FIG. 12 in turn schematically illustrates another solution of the inventive embodiment. Here, the same principle applies, i.e. provision is made for only one guiding groove 08 comprising only one guiding surface 10. In this instance, the bearing shaft 04 moves along the first guiding surface 10. Thus, the position of the support element 02 is sufficiently defined by the bearing shaft 04 and the transmission mechanism 05. For limiting the range of movement again a bolt can be employed, which, however, is not situated in a guiding groove but is limited on the inner surface of the bracket 03 via a stop 13.

Figure 13:
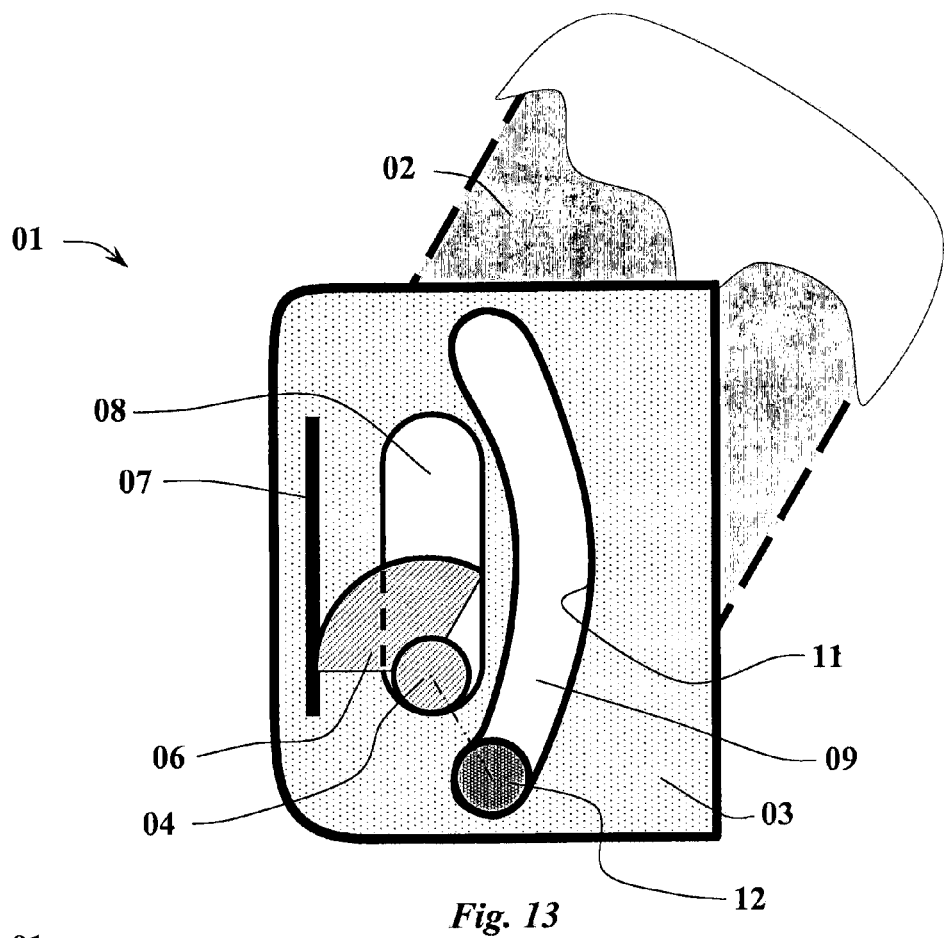
FIG. 13 shows a schematic diagram of another inventive arrangement with two guiding grooves, wherein only the second guiding groove is provided.

Alternatively thereto, FIG. 13 schematically illustrates an arm rest 01 in the rest position, wherein the second guiding groove 09 guides the bolt 12 along the second guiding surface 11. By means of this measure, the position of the support element 02 is likewise defined by the bearing shaft 04, respectively the transmission mechanism 05 as well as by the abutment of the bolt 12 against the second guiding surface 11. In this context, it is apparent that the dimensions of the first guiding groove 08 may be larger than the dimensions of the bearing shaft 04.

Figure 14:
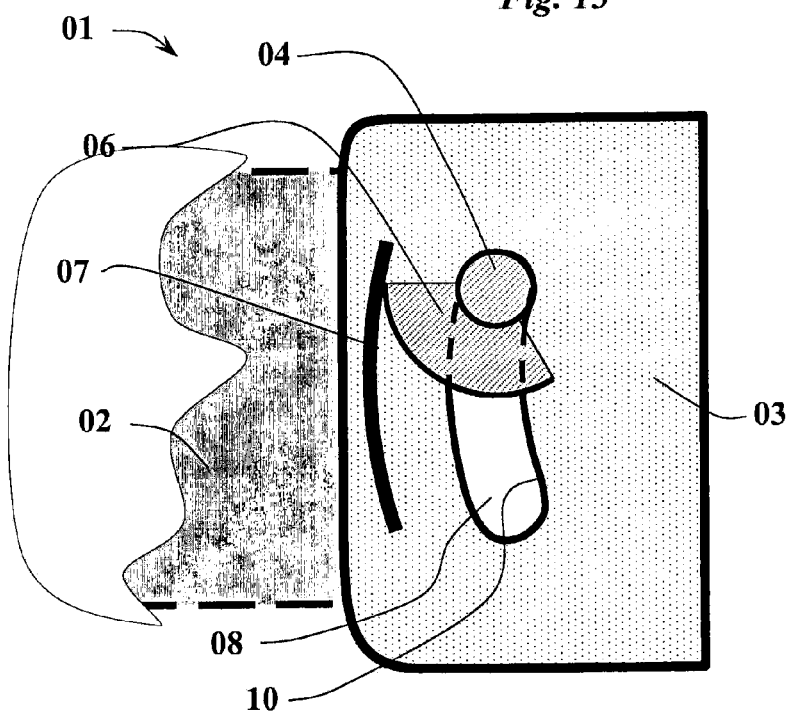
FIG. 14 shows a schematic diagram of another inventive arrangement with a bent trajectory, respectively a bent course of the second transmission element.

In all of the solution options presented above, the second transmission element 07 is designed as a straight gear rod. In this context, FIG. 14 schematically illustrates an alternative embodiment, wherein the second transmission element 07 here describes the shape of an arc. The design of the second transmission element defines the trajectory along which the bearing shaft 04 moves. Hence, it is necessary to configure the first guiding surface 10, respectively alternatively the second guiding surface 11, with a design being correspondingly complementary to the design of the second transmission element 07, respectively to the trajectory of the bearing shaft 04.

Figure 15:
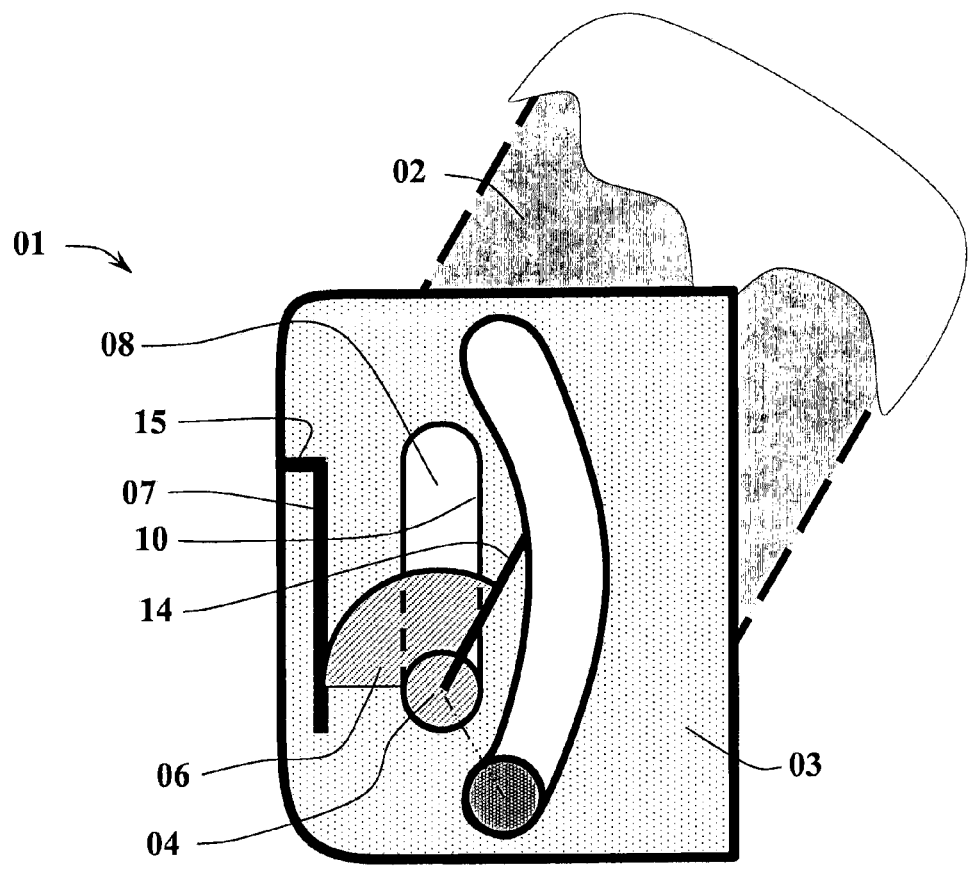
FIG. 15 shows a schematic diagram of another inventive arrangement comparable to that of FIG. 7 with an additional carrier element in the rest position.
Figure 16:
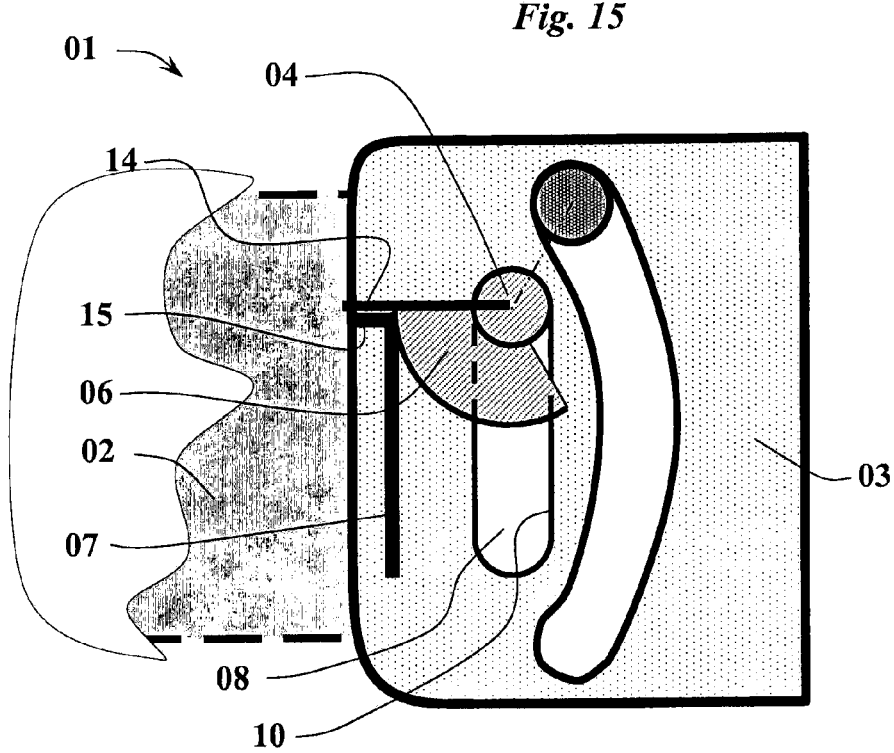
FIG. 16 shows a schematic diagram corresponding to FIG. 15 in a support position.

Ultimately, FIG. 15 schematically illustrates another embodiment of the inventive solution, wherein this solution firstly is similar to the schematically illustrated solution of FIG. 7. When contemplating FIG. 16, it is apparent that a force which is applied to the support element 02 needs to be transmitted via the transmission mechanism 05 without any additional means, as schematically illustrated in FIG. 8. In order to make sure that the force transmission from the bearing shaft 04 to the bracket 03 is not performed via the engagement from the first transmission element 06 to the second transmission element 07, to this end, provision is made for a first carrier element 14 which is firmly connected to the bearing shaft 04 and a second carrier element 15, which for this purpose is firmly connected to the bracket 03. It is apparent that the abutment of the first carrier element 14 needs to be performed on the second carrier element 15 on the outside of the first transmission element 06.

To optimize the guiding action of the support element 02 in its movement between the rest position and the support position, for this purpose it may be advantageous to provide a damping element, respectively a catch element. To this end, a separate element may be fastened to the bracket 03 and may here for instance apply a pretension to the bolt. A particularly advantageous embodiment, however, can be realized if a separate element is not required, cf. FIGS. 1 to 6. For this purpose, in a simple embodiment, the bracket 03 may be equipped with a clamping element 16 in the design of a web which extends in parallel along the second guiding groove 09. For this purpose, the second guiding surface 11 is pressed against the bolt 12 while being under an elastic pretension. FIGS. 1 to 6 show a clamping element 16 in a simple embodiment in the design of a narrow web, which is capable of resiliently yielding radially towards the outside when the bolt slides past. Thus, a guiding action free of play and simultaneously a locking engagement in both final positions is realized.

The invention claimed is:

1. An arm rest for arrangement at a seat or a seat bench in a vehicle, comprising at least one bracket, which can be fastened to the seat or the seat bench, and comprising an armrest support element, fixed to a bearing shaft at least at one fastening point, and wherein the bearing shaft is swivelably and traslatably mounted at the bracket in at least one swivel bearing, and wherein the support element swivels between a swiveled-up rest position and a swiveled-down support position, wherein the bearing shaft is supported at the bracket so as to be displaceable along a trajectory defined by a first groove and a second groove in the bracket, the bearing shaft moving between an upper functional position and a lower functional position, and wherein a transmission mechanism includes a first transmission element comprising a gear wheel or a friction wheel fixed to the bearing shaft and a second transmission element comprising a gear rod fixed to the bracket on an opposite side of the first groove relative to the second groove, wherein a swiveling movement of the support element is transmitted via the transmission mechanism to a displacing movement of the bearing shaft along the trajectory between the upper functional position and the lower functional position as the support element swivels between the swiveled-up rest position and the swiveled-down support position.

2. The arm rest according to claim 1, in which in the rest position, the arm rest forms a part of a back rest.

3. The arm rest according to claim 1, in which the bearing shaft occupies the upper functional position in the support position of the support element and the lower functional position in the rest position of the support element.

4. The arm rest according to claim 1, in which the transmission mechanism is formed by the first and the second transmission element, wherein the first transmission element is fixedly connected to the bearing shaft or is formed as a part of the bearing shaft, wherein in particular the first transmission element features the design of a gear wheel segment or friction wheel segment.

5. The arm rest according to claim 4, in which the second transmission element is fixedly connected to the bracket or is formed as a part of the bracket, wherein in particular the second transmission element is formed as a gear rod.

6. The arm rest according to claim 4, in which the forces acting essentially vertically on the support element in the support position are transmitted via the first transmission element and/or a first carrier element, which is fixedly connected thereto, to the second transmission element and/or a second carrier element, which is fixedly connected thereto.

7. The arm rest according to claim 4, wherein a movement of the bearing shaft transversal to the trajectory is prevented by the transmission mechanism on one side and first and/or second guiding surfaces of the first and second grooves on the other side.

8. The arm rest according to claim 7, in which the first and second grooves are first and second guiding grooves, wherein the support element comprises at least one bolt arranged at a distance from the bearing shaft, wherein the bolt is allowed to slide along the second guiding surface of the second guiding groove, wherein one end of the second guiding groove limits the path of the bolt at least in the support position.

9. The arm rest according to claim 4, in which the first transmission element is mounted at the bearing shaft, wherein by the selection of the diameter of the transmission element, the range of travel between the upper and lower functional position is varied while the second transmission element and the position of the first and/or the second guiding surface are adapted.

10. The arm rest according to claim 1, in which two transmission units are provided which are symmetrical with respect to the center of the arm support element.

11. The arm rest according to claim 1, in which coinciding movement of the bearing shaft between the upper functional position and the lower functional position is driven by swivel movement of the support element between the swiveled-up rest position and the swiveled-down support position.

12. An arm rest for arrangement at a seat or a seat bench in a vehicle, said arm rest comprising:
at least one bracket fastenable to the seat or the seat bench;
a bearing shaft swivelably and translatably mounted to the bracket in at least one swivel bearing, the bearing shaft being supported at the bracket and displaceable along a trajectory defined by a first groove and a second groove in the bracket, the bearing shaft moving between an upper functional position and a lower functional position;
an armrest support element fixed to the bearing shaft at least at one fastening point, wherein the support element swivels between a swiveled-up rest position and a swiveled-down support position about the bearing shaft as the bearing shaft coincidingly moves between the upper functional position and the lower functional position; and a transmission mechanism includes a first transmission element comprising a gear wheel or a friction wheel fixed to the bearing shaft and a second transmission element comprising a gear rod fixed to the bracket on an opposite side of the first groove relative to the second groove, wherein a swiveling movement of the support element is transmitted via the transmission mechanism to a displacing movement of the bearing shaft along the trajectory.

13. The arm rest according to claim 12, in which coinciding movement of the bearing shaft between the upper functional position and the lower functional position is driven by swivel movement of the support element between the swiveled-up rest position and the swiveled-down support position.

* * * * *